(12) United States Patent
Kennerknecht et al.

(10) Patent No.: US 6,938,448 B2
(45) Date of Patent: Sep. 6, 2005

(54) SHAPED METAL PANELS AND FORMING SAME BY SHOT PEENING

(75) Inventors: Steven Kennerknecht, Laval (CA); David Cook, Mirabel (CA)

(73) Assignee: Sonaca NMF Canada Inc., Mirabel (CA)

( * ) Notice: Subject to any disclaimer, the term of this patent is extended or adjusted under 35 U.S.C. 154(b) by 0 days.

(21) Appl. No.: 09/946,574

(22) Filed: Sep. 5, 2001

(65) Prior Publication Data

US 2002/0050157 A1 May 2, 2002

(30) Foreign Application Priority Data

Sep. 8, 2000 (CA) .............................................. 2317845

(51) Int. Cl.⁷ ................................ C21D 7/06; B21J 5/00
(52) U.S. Cl. ............................... 72/53; 29/90.7; 451/38; 451/39
(58) Field of Search ............................. 72/53; 29/90.7; 451/38, 39

(56) References Cited

U.S. PATENT DOCUMENTS

| 2,701,408 | A | * | 2/1955 | Borger .......................... 72/53 |
| 3,668,912 | A | * | 6/1972 | Baughman et al. ............. 72/53 |
| 3,705,511 | A | | 12/1972 | Brandel et al. |
| 4,329,862 | A | | 5/1982 | Harburn et al. |
| 4,350,035 | A | | 9/1982 | Kopp et al. |
| 4,694,672 | A | | 9/1987 | Baughman |
| 5,072,606 | A | * | 12/1991 | Koehler et al. ............... 29/90.7 |
| 5,205,145 | A | * | 4/1993 | Ishino et al. ................. 29/90.7 |

* cited by examiner

*Primary Examiner*—David Jones
(74) *Attorney, Agent, or Firm*—Collard & Roe, P.C.

(57) ABSTRACT

A panel, such as is intended for an aircraft wing panel, has continuous ribs extending on one surface. The panel is formed, or given a dihedral bend, by shot peening the ribs at a V-shaped section to expand the V-shaped sections and thus deform the panel. A strong formed panel is thus provided with continuous ribs. Further shot peening steps can be carried out on the panel for further shaping.

6 Claims, 5 Drawing Sheets

SHAPED METAL PANELS AND FORMING SAME BY SHOT PEENING

FIELD OF THE INVENTION

This invention relates to metal forming, for example for the manufacture of aircraft wing panels. In particular it relates to the forming of metal panels by shot peening, and in particular relates to the forming of panels with integral ribs thereon.

BACKGROUND OF THE INVENTION

A typical example of a formed metal panel is an aircraft wing panel. Such panels have longitudinal ribs on their undersides for strengthening and/or stiffening the panel. These ribs complicate the metal-forming process when the panel is shaped into its desired configuration. It is often desired to form a wing panel with a dihedral configuration, and also, often in addition, give the panel a curved form in a direction normal to the dihedral to form a "saddleback" configuration.

Hitherto, wing panels have been formed with a dihedral, by shot peening. However, the strengthening/stiffening ribs are discontinued in the vicinity of the bend, or bends, to permit the panel to be formed. This limits the strength of the panel and the final wing, and often extra material has to be provided to maintain a desired consistent strength for the whole panel and the associated wing structure.

Considerable prior art describes metal forming by shot peening. One example, for forming an aircraft wing skin panel, is U.S. Pat. No. 4,329,862, Harbum et al, which describes shot peening flat sheets on both sides in predetermined patterns to create localized growth and to match a span wise curve, and on one side to match a chord-wise curve. U.S. Pat. No. 4,694,672, Baughman, describes shot peening of an aircraft skin in narrow bands or strips spanwise on a common chord to form a simple curve. U.S. Pat. No. 3,705,511, Brandel et al, deforms by metal balls falling under gravity. U.S. Pat. No. 4,350,035 describes shaping or forming an article by shot peening or blasting.

None of the prior art describes the forming of metal panels having integral ribs which are continuous over the locality or localities at which the panel is formed. Prior art techniques require that the ribs be discontinuous in the region of a bend to avoid compression or tension on the ribs. In order to provide a curved ribbed panel having superior characteristics, it is desirable to provide a method for forming a completely curved panel with a continuous rib structure.

SUMMARY OF THE INVENTION

The present invention provides for the forming of metal panels having integral ribs, whereby the ribs remain continuous for the full length of the panel. This is achieved by shot peening the ribs over a V-shaped section, the point of the V being located at the panel surface. This produces a controlled longitudinal growth of the rib with simultaneous forming or bending of the panel. For a wing panel the V-shaped section is at a position where a dihedral angle is required. For a plurality of ribs extending side by side, each rib has a V-shaped section shot peened. Further shot peening can be applied to one or more areas of the panel itself. Also some pre-stressing can be applied to facilitate the peenforming stage and to more precisely direct the direction of curvature of the panel. The invention also encompasses formed metal panels having integral ribs on one side, the ribs each having an expanded V-shaped section having an outer expanded length greater than an inner expanded length, the inner expanded being at the panel surface and the outer length being on a side of the rib opposed to the inner length. The V-shaped section is formed b shot peening by the above-described method, and has a thickness which is less than the adjacent non-expanded portion.

BRIEF DESCRIPTION OF THE DRAWINGS

FIG. 1 illustrates a conventional panel, for example for an aircraft wing, comprising a skin 10 with stiffening ribs or stringers 12. The panel is formed to have a dihedral at 14. This can be obtained by shot blasting the skin on its inner surface 16 to give a bend, as shown. For the panel to be bent, or formed, it has hitherto been necessary that the ribs do not extend across the area in which the dihedral forming occurs. In an aircraft wing panel, as an example, the skin 10 and the ribs 12 are often machined from a solid slab of metal. In other forms, the ribs may be applied to a sheet, as by welding, rivetting, etc.

In all circumstances, the panel is weakened by the ribs being discontinuous. To make up for this loss of strength it is often necessary to provide extra thickness in the skin and possibly additional material elsewhere such as splice plates and angles.

Figure 1:
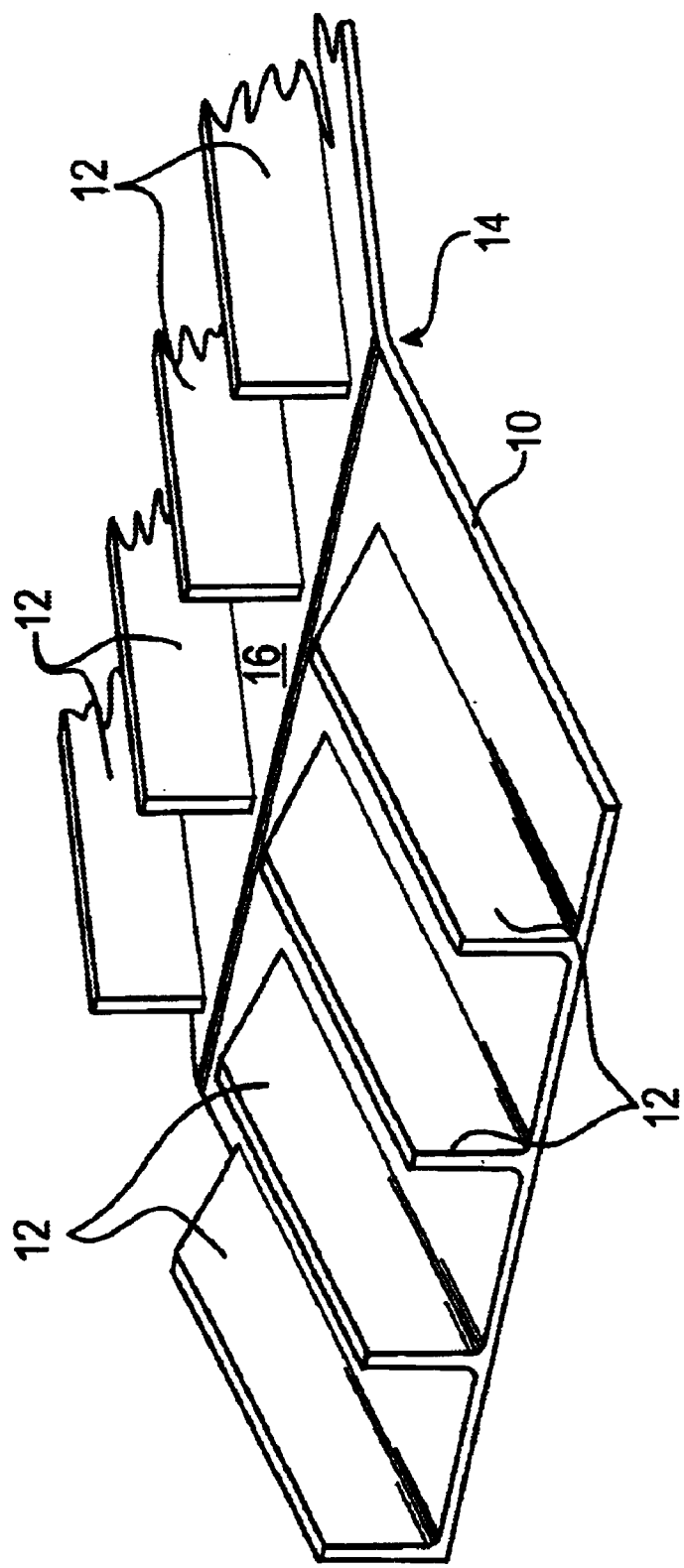
FIG. 1 is a diagrammatic view of a conventional formed panel.
Figure 2:
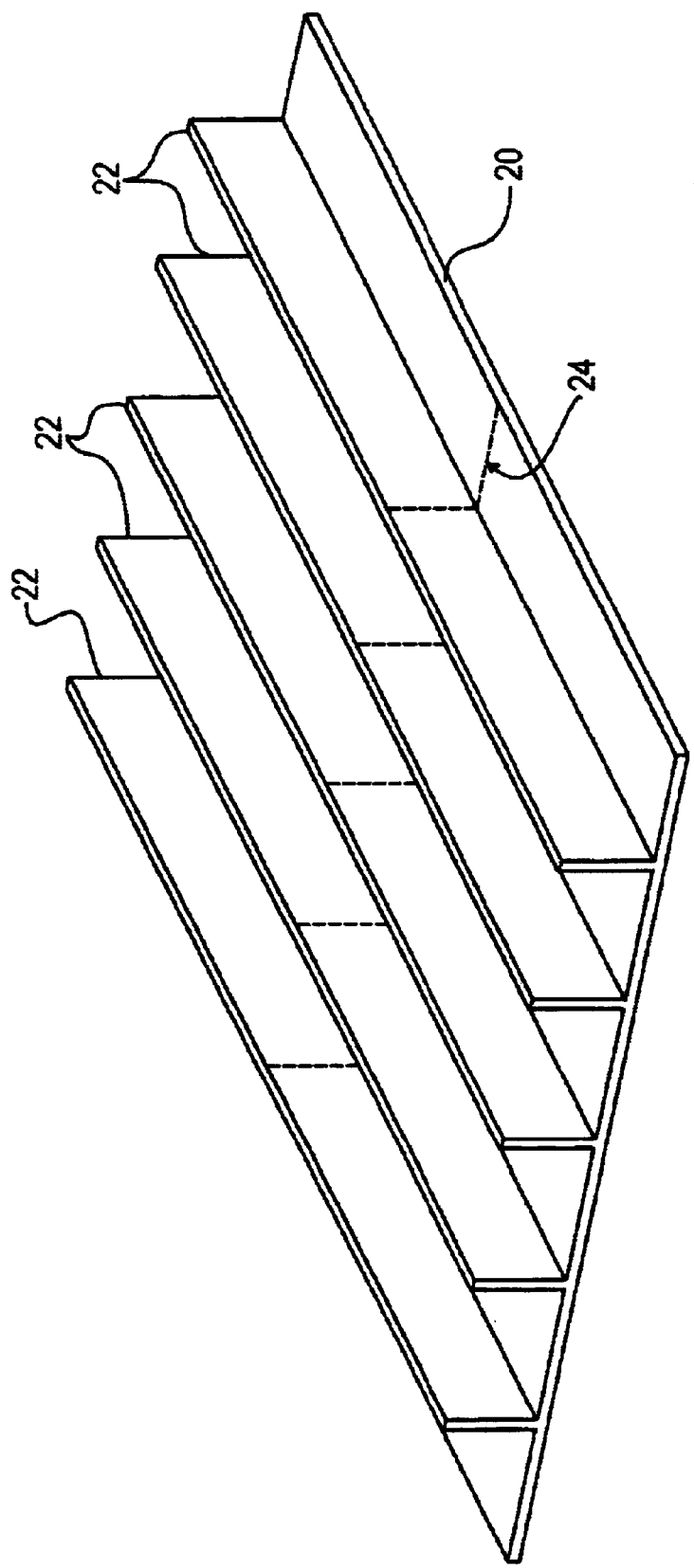
FIG. 2 is a similar diagrammatic view of a panel before forming in accordance with the invention.
Figure 3:
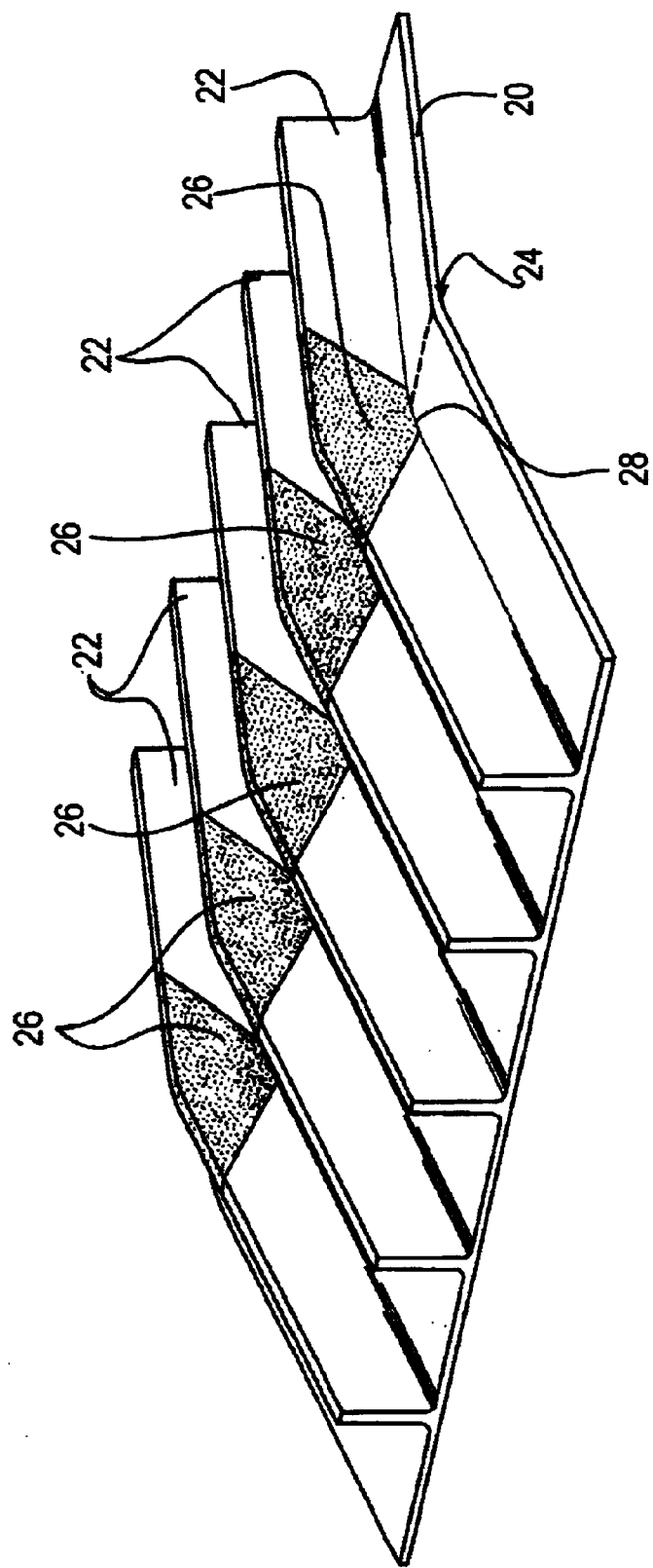
FIG. 3 is a view similar to that of FIG. 2 illustrating a panel after forming.

Turning to the present invention, FIG. 2 illustrates a panel prior to forming. There is a skin 20 and ribs or stringers 22. In this instance, the ribs are continuous, including across a position 24 where it is desired that the panel be bent or formed. FIG. 3 illustrates the panel of FIG. 2 after it has been formed. This is obtained by the shot peening areas 26 of the ribs 22 coincident with the position 24 of the bend or formation. The areas 26 are V-shaped with the apex of the V being at the skin 20. The V-shape does not normally come to a point but may comprise a narrow tip 28, as shown. The areas 26 are given a heavy peening at a high intensity. The effect of the shot peening is to grow the ribs or stringers, the deformation being larger at the outer edge of the ribs than at the skin. The ribs will be stretched differentially from the apex of the V section to the outer edge of the ribs increasing the length differentially. This results in the rib bending, with the skin 20, to form a dihedral.

The skin can also be shot peened on its skin 30 local to the areas 26 to further induce the forming of the panel.

Figure 4:
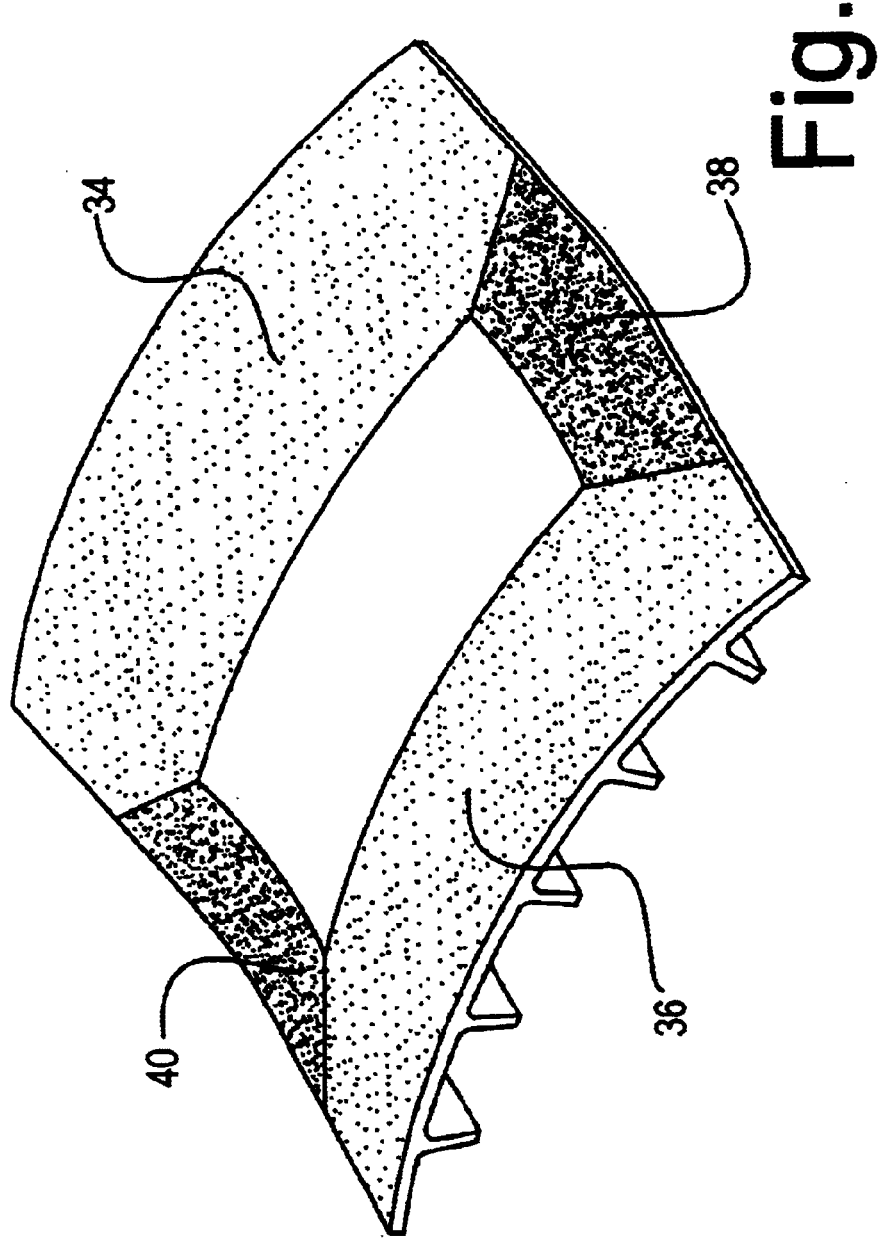
FIG. 4 is a diagrammatic view of a panel after forming as in FIG. 3, with other areas shot peened to produce further forming.

After forming, further peening can be carried out on the panel for further forming. For example, as shown in FIG. 4, areas 34 and 36 on the skin surface opposite to that to which the ribs are attached, can be given a regular peening at a regular intensity. Areas 38 and 40 can be given a medium peening at a high intensity. These peening operations will cause the panel to curve, as shown.

As is well known in the art of shot peening, various tools may be used to impart a residual compressive stress to the surface of a component. Propelling hard spherical shot (steel, ceramic, etc.) against a workpiece, is commonly effected by either a revolving centrifugal wheel, or pneumatic pressure blasting equipment, although other techniques are also practiced. Peening intensity is a function of shot size, hardness, velocity and tooling distance. Standard intensity is commonly measured via an Almen gauge with various ranges for intensities. The peening intensity selected for a particular workpiece depends on material type, thickness and level of compressive stress to be imparted for the application.

For aluminium components such as aircraft wing skin panels, a compressive stress layer may be imparted on the workpiece in order to improve fatigue strength of the structure and prevent crack initiation and growth intensities. As an example, skin panels having thicknesses between 0.090" and 0.375" commonly employ steel shot sizes of s190–s330 (0.019" to 0.033") diameter with Almen intensities of 0.006–0.010A.

For peen forming of wing skins, higher intensities are employed in order to grow the surface layer of the workpiece and impart the required differential curvature. Although a variety of shot materials, shot sizes and variables may be used, the following table offers some typical guidelines of aluminum alloy wing panel material thickness and peen forming parameters employed:

| Material Thickness | Intensity | Shot Size |
|---|---|---|
| 0.070–0.12" | 0.006–0.010A | s230 |
| 0.120–0.200" | 0.010–0.016A | s230–s330 |
| 0.200–0.300" | 0.016A–0.006C | s330–s550 |
| 0.300"-up | 0.006C–0.030C | s550–1/8" |

For an aircraft wing or similar structure, the ribs extend span-wise (i.e. length-wise). With a wing panel as in FIG. 4, the wing will have both a dihedral, and a curved profile chord-wise. At the dihedral area, a saddle-shaped configuration is achieved.

Figure 5:
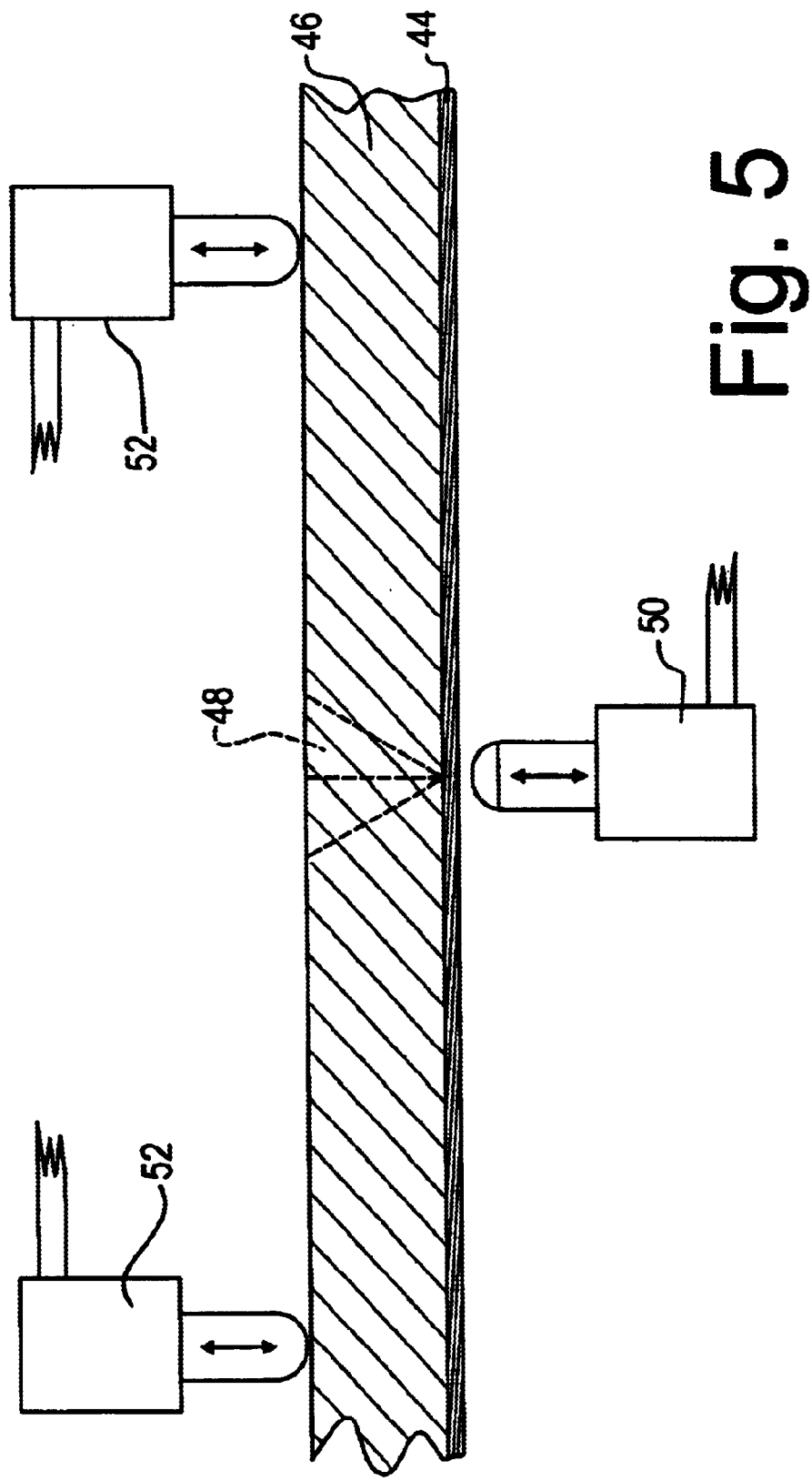
FIG. 5 illustrates pre-stressing of a panel before and during shot peening.

In addition to peening, some pre-stressing can be applied. As illustrated in FIG. 5, a panel 44, with ribs 46 and peening areas 48 is positioned on one support 50, which may be a hydraulic jack arrangement. Two pressing members 52 are positioned above the panel, one on either side of support 50. Members 52 can also be hydraulic jacks as well. Prior to peening the ribs, the members 50 & 52 are powered to act on the panel and pre-stress it. As peening progresses, the pre-stress can be maintained, or allowed to slowly increase or decrease, as desired.

The pre-stress applied to any particular panel will depend on the desired panel configuration and the alloy, to ensure that the resulting panel deformation occurs within the plastic range of the panel. Typically, the pre-stress is 20–80% of the panel yield stress.

Thus the invention provides for the manufacture of metal panels having strengthening ribs in which a forming, or bending, transversely of other ribs can be provided while providing a continuity in the ribs.

While the invention has primarily been described in relation to panels for aircraft wings, it is also applicable to panels for other uses. Whether the panels with continuous ribs are formed by machinery from solid slabs of metal, as is often done for aircraft wings, or by attaching ribs to a sheet of metal, there is provided both a novel and strong formed panel, and a novel method for forming such panels.

What is claimed is:

1. A process of forming a metal panel having continuous ribs extending along a length of the panel, comprising providing a metal panel of substantially planar configuration with said ribs extending on one surface, subjecting each of said ribs to a shot peening step over a V-shaped section at a position where a bend is to be formed in said panel, the point of the V being at said one surface, the shot peening expanding each of the ribs in said V-shaped section, causing said V-shaped section to have an outer expanded length greater than an inner expanded length, said inner expanded length being on the side of the rib at said one surface and said outer expanded length being on the side of the rib opposed to said one surface.

2. A process as claimed in claim 1, said panel having a further surface spaced from said one surface, and including the further step of shot peening defined sections of said further surface.

3. A process as claimed in claim 1, including pre-stressing the panel prior to peening said ribs.

4. A process of forming an aircraft wing panel having continuous spaced apart integral rib stringers extending axially along the length of the panel, comprising providing a wing panel of a substantially planar outer configuration with said rib stringers extending on an interior opposed surface of said panel, subjecting the wing panel, on its interior surface containing said rib stringers, to a peening step, said peening step being carried out by subjecting each said rib stringer to the action of peening shot over a V-shaped section of the rib stringer at the point where a bend is to be formed in said wing, the point of the V being at said interior surface, to expand said rib stringer in said V-shaped section.

5. A process as claimed in claim 4, said wing panel having a further surface spaced from said interior surface, and including the further step of shot peening defined sections of said further surface.

6. A process as claimed in claim 4, including pre-stressing the wing panel prior to peening said rib stringers.

* * * * *